United States Patent
Yang

(10) Patent No.: US 11,939,902 B2
(45) Date of Patent: Mar. 26, 2024

(54) APPARATUS AND METHOD FOR PURIFYING EXHAUST GAS IN HYBRID ELECTRIC VEHICLE

(71) Applicants: Hyundai Motor Company, Seoul (KR); Kia Corporation, Seoul (KR)

(72) Inventor: Il Suk Yang, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/875,761

(22) Filed: Jul. 28, 2022

(65) Prior Publication Data
US 2023/0059437 A1    Feb. 23, 2023

(30) Foreign Application Priority Data
Aug. 23, 2021 (KR) .......... 10-2021-0110685

(51) Int. Cl.
| | | |
|---|---|---|
| F01N 3/20 | (2006.01) | |
| B60W 20/16 | (2016.01) | |
| F01N 3/30 | (2006.01) | |
| F02B 39/10 | (2006.01) | |
| F02D 41/00 | (2006.01) | |
| F02D 41/06 | (2006.01) | |

(Continued)

(52) U.S. Cl.
CPC .......... *F01N 3/2013* (2013.01); *B60W 20/16* (2016.01); *F01N 3/306* (2013.01); *F02B 39/10* (2013.01); *F02D 41/0077* (2013.01); *F02D 41/064* (2013.01); *F02M 26/03* (2016.02); *F02M 26/22* (2016.02); *F02M 26/71* (2016.02)

(58) Field of Classification Search
CPC ...... F01N 3/2013; F01N 3/306; B60W 20/16; F02B 39/10; F02D 41/0077; F02D 41/064; F02M 26/03; F02M 26/22; F02M 26/71
USPC ............................................. 60/605.1, 605.2
See application file for complete search history.

(56) References Cited

U.S. PATENT DOCUMENTS

2001/0035171 A1* 11/2001 Kim .................. F02B 37/16
60/602
2018/0030934 A1   2/2018 Lee et al.
(Continued)

FOREIGN PATENT DOCUMENTS

| DE | 102019125118 A1 | 6/2020 |
|---|---|---|
| DE | 102019135831 A1 | 8/2020 |
| WO | WO 2020/069549 | 4/2020 |

*Primary Examiner* — Hoang M Nguyen
(74) *Attorney, Agent, or Firm* — MORGAN, LEWIS & BOCKIUS LLP

(57) ABSTRACT

An apparatus of purifying exhaust gas of a hybrid vehicle includes an electric supercharger disposed on an air intake line, a post-treatment unit disposed on an exhaust gas line and including an electrically-heated catalyst, an exhaust gas recirculation unit including an exhaust gas recirculation cooler disposed on a recirculation line connecting the post-treatment unit and the intake line and an exhaust gas recirculation valve disposed on the recirculation line, a three-way valve disposed at a position at which the recirculation line diverges into a front end portion and a rear end portion of the intake line, and a controller electrically connected to the three-way valve and configured for controlling the three-way valve connecting the intake line and the recirculation line at the front end portion of the electric supercharger to be selectively opened or closed.

13 Claims, 3 Drawing Sheets

(51) Int. Cl.
     *F02M 26/03*      (2016.01)
     *F02M 26/22*      (2016.01)
     *F02M 26/71*      (2016.01)

(56) References Cited

U.S. PATENT DOCUMENTS

| | | | |
|---|---|---|---|
| 2019/0316551 A1* | 10/2019 | Oh | F02M 35/10006 |
| 2020/0109675 A1* | 4/2020 | Han | F01N 5/04 |
| 2020/0182202 A1* | 6/2020 | Hong | B60W 30/1882 |
| 2020/0240371 A1* | 7/2020 | Oh | F02D 41/0007 |

\* cited by examiner

APPARATUS AND METHOD FOR PURIFYING EXHAUST GAS IN HYBRID ELECTRIC VEHICLE

CROSS REFERENCE TO RELATED APPLICATION

The present application claims priority to Korean Patent Application No. 10-2021-0110685, filed Aug. 23, 2021, the entire contents of which is incorporated herein for all purposes by this reference.

BACKGROUND OF THE INVENTION

Field of the Invention

The present disclosure relates generally to an apparatus and method for purifying exhaust gas in a hybrid electric vehicle, and more particularly, to an apparatus and method for purifying exhaust gas of a hybrid electric vehicle, wherein, when the application of an electrically-heated catalyst (EHC) and an air supply system is required to shorten light-off time in a lean burn engine for a hybrid electric vehicle (HEV) using an electric supercharger and an exhaust gas recirculation (EGR) system, the supercharging function of the supercharger may be used as an air supply system during heating of a catalyst.

Description of Related Art

Recently, with increasing concerns about not only the performance of vehicles but also the fuel efficiency and environmental pollution of vehicles, laws and regulations on the discharge of exhaust gas have been intensified. Furthermore, due to such restrictions against exhaust gas and the development of engine technology for improving the fuel efficiency, methods of activating a catalyst system have been provided.

In such catalyst systems, a method of increasing the amount of a noble metal to improve the purification activity of the catalyst system, a method of additionally controlling an engine to increase the temperature of exhaust gas, and the like are used.

However, when the amount of noble metal is increased, the problem of increased cost and the problem of fuel efficiency have also occurred. Furthermore, as a method of increasing the temperature of exhaust air by controlling the engine, a method of activating a catalyst by transmitting heat obtained to the catalyst by fuel after injection has been used. However, according to such a method, less than 30% of exhaust gas energy for increasing the temperature of exhaust gas may be transmitted to the catalyst. Thus, energy loss may be increased, disadvantageously reducing efficiency. Furthermore, the fuel after injection may have an adverse effect on the fuel efficiency.

To overcome the above-described problems of the strategies absolutely dependent on the temperature of exhaust gas, a method of using electrically-heated catalyst (EHC) technology has been provided.

According to the present method, the catalyst may be rapidly activated by heat generated by applying power to the catalyst, improving exhaust gas purification performance. However, such a device utilizes power from a battery and utilizes maximum power of 90 A. Thus, when the device is more frequently used, the consumption of the battery may be further accelerated, overworking an alternator charging the battery.

When power supplied to operate such an EHC system is constantly supplied, activation performance may be beneficial in low-speed driving and frequent start and stop. However, the power of the battery may be excessively consumed, and the alternator may overwork, and fuel efficiency may be reduced. Furthermore, a 48V power supply system (e.g., a 48V MHSG, a DC/DC converter, a 48V battery or the like for internal combustion engine (ICE) vehicles and a 48 LDC or the like for hybrid electric vehicles (HEVs)), an EHC, a control unit, and the like may be mounted on a vehicle. Furthermore, because an air supply system, such as an air pump, an on/off valve, a BPS, an air pipe, or a connection gasket, may be provided, the problem of excessive material costs may occur, and it may be difficult to package the components.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and method for purifying exhaust gas of a hybrid electric vehicle, wherein, in a lean burn engine for a hybrid electric vehicle (HEV) using an electric supercharger and an exhaust gas recirculation (EGR) system, a three-way valve connecting a supercharger and an EGR line is provided, and before start of the engine, the three-way valve is selectively opened so that supercharging air from the supercharger is blown toward the EHC through the EGR line, so that the catalyst may be heated by delivering high-temperature EHC air to the catalyst, shortening the light-off time of the EHC.

In various aspects of the present disclosure, there is provided an apparatus of purifying exhaust gas of a hybrid vehicle. The apparatus may include: an electric supercharger disposed on an intake line through which intake air to be supplied to cylinders of an engine flows; a post-treatment unit disposed on an exhaust line through which exhaust gas discharged from the cylinders flows and including an electrically-heated catalyst; an exhaust gas recirculation unit including an exhaust gas recirculation cooler disposed on a recirculation line connecting the post-treatment unit and the intake line and an exhaust gas recirculation valve disposed on the recirculation line; a three-way valve disposed at a position at which the recirculation line diverges into a front end portion and a rear end portion of the intake line; and a controller electrically connected to the three-way valve and configured for controlling the three-way valve connecting the intake line and the recirculation line at the front end portion of the electric supercharger to be selectively opened or closed so that air discharged from the electric supercharger flows toward the post-treatment unit through the recirculation line.

When a vehicle door is opened in a cold start condition, before the engine is ignited, the controller may be configured to control the electrically-heated catalyst to be activated, control ambient air to be supplied to the electric supercharger by opening a shut-off valve, turn the electric supercharger on, and then, control the three-way valve so that the air discharged from the front end portion of the electric supercharger flows toward the electrically-heated catalyst.

When an operation time for heating the electrically-heated catalyst has passed for a predetermined operation time or shorter than the predetermined operation time, the controller may be configured to determine again whether the engine is ignited.

When the engine is ignited, the controller may switch an opening amount of the shut-off valve to an initial state, control the electric supercharger to be turned off, and control the opening and closing of the three-way valve to block opening of the front end portion of the electric supercharger and opening of the recirculation line.

When the engine has not been ignited beyond the predetermined operation time, the controller may be configured to control the electrically-heated catalyst to be deactivated and the electric supercharger to be turned off.

When a predetermined electric vehicle mode stop condition is met while driving in electric vehicle mode, before the engine is ignited, the controller may be configured to control operation of the electrically-heated catalyst, control ambient air to be supplied to the electric supercharger by opening the shut-off valve, turns the electric supercharger on, and then, control the three-way valve to direct the heated air, discharged from the front end portion of the electric supercharger, toward the electrically-heated catalyst.

the electric vehicle mode stop condition is set in advance to meet a condition in which the state of charge of a battery is equal to or lower than a predetermined value.

According to various aspects of the present disclosure, there is provided a method of purifying exhaust gas of a hybrid vehicle, the method includes: a first operation of, when a vehicle door is opened, measuring an ambient temperature using a temperature sensor and determining whether the ambient temperature satisfies a cold start condition; a second operation of, before an engine is ignited in the cold start condition, controlling, by a controller, a three-way valve to direct air discharged from a front end portion of an electric supercharger to be blown toward an electrically-heated catalyst through a recirculation line; a third operation of, after the air is blown toward the electrically-heated catalyst, when an operation time for heating the electrically-heated catalyst has passed for a predetermined operation time or shorter than the predetermined operation time, determining again whether the engine is ignited; and a fourth operation of, when the engine is ignited in a situation in which the electrically-heated catalyst is heated by the heated air, turning the electric supercharger off, controlling, by the controller, the three-way valve to block opening of the recirculation line, and then, starting the engine.

The second operation may include, sequentially: controlling the electrically-heated catalyst to be activated; opening the shut-off valve so that the ambient air is supplied; turning the electric supercharger on; and controlling the three-way valve to direct the heated air, discharged from the front end portion of the electric supercharger, to flow toward the electrically-heated catalyst.

When the engine has not been ignited beyond the predetermined operation time, the fourth operation may control the electrically-heated catalyst to be deactivated and the electric supercharger to be turned off.

According to various exemplary embodiments of the present disclosure, in a lean burn engine for an HEV using an electric supercharger and an exhaust gas recirculation (EGR) system, the three-way valve connecting the supercharger and the EGR line is provided. Before start of the engine, the three-way valve is selectively opened so that supercharging air from the supercharger is blown toward the EHC through the EGR line. Consequently, the catalyst may be heated by delivering high-temperature EHC air to the catalyst, shortening the light-off time of the EHC.

Furthermore, according to various exemplary embodiments of the present disclosure, a separate air supply system, such as an air pump, an on/off valve, a BPS, an air pipe, or a connection gasket, for delivering supercharging air from the supercharger to the EHC is not required. Consequently, it is possible to prevent the problem of excessive material costs.

As set forth above, the present disclosure is not provided with the air supply system. Thus, in a situation in which a free space within the engine is insufficient, the difficulty to form a package and the problem of the increased engine size when forming the package, caused by the excessively increased number of components, may be prevented.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
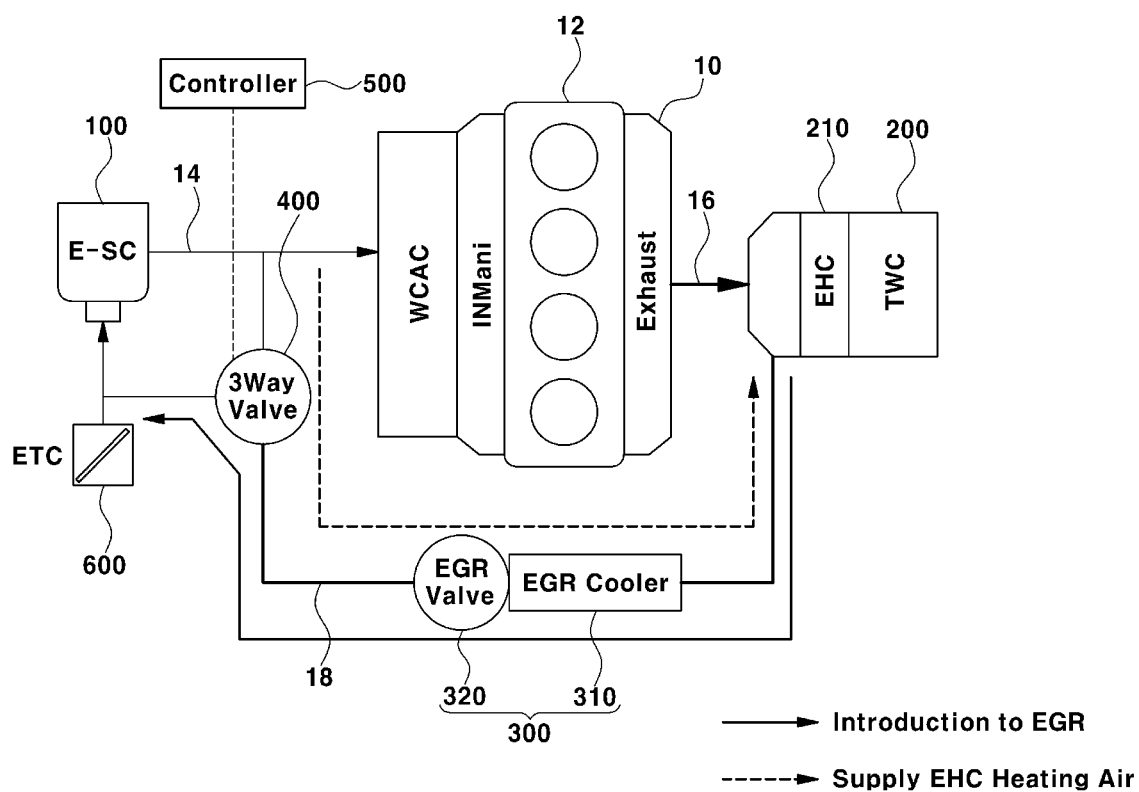
FIG. 1 is a diagram illustrating a structure of an apparatus of purifying exhaust gas of a hybrid vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described with reference to the accompanying drawings.

The above and other advantages and features of the present disclosure, as well as methods for realizing such advantages and features will be more clearly understood from the following detailed description when taken in conjunction with the accompanying drawings.

However, the present disclosure is not limited to specific embodiments to be described hereinafter but may be embodied in a variety of different forms. Rather, these embodiments are provided so that the description of the present disclosure will be complete and will fully convey the scope of the present disclosure to those skilled in the field of the present disclosure to which various exemplary embodiments of the present disclosure pertains. The present disclosure shall be defined by the scope of the Claims.

Furthermore, in the following description of the present disclosure, a detailed description of known technology or the like will be omitted when the subject matter of the present disclosure may be rendered rather unclear thereby.

Figure 2:
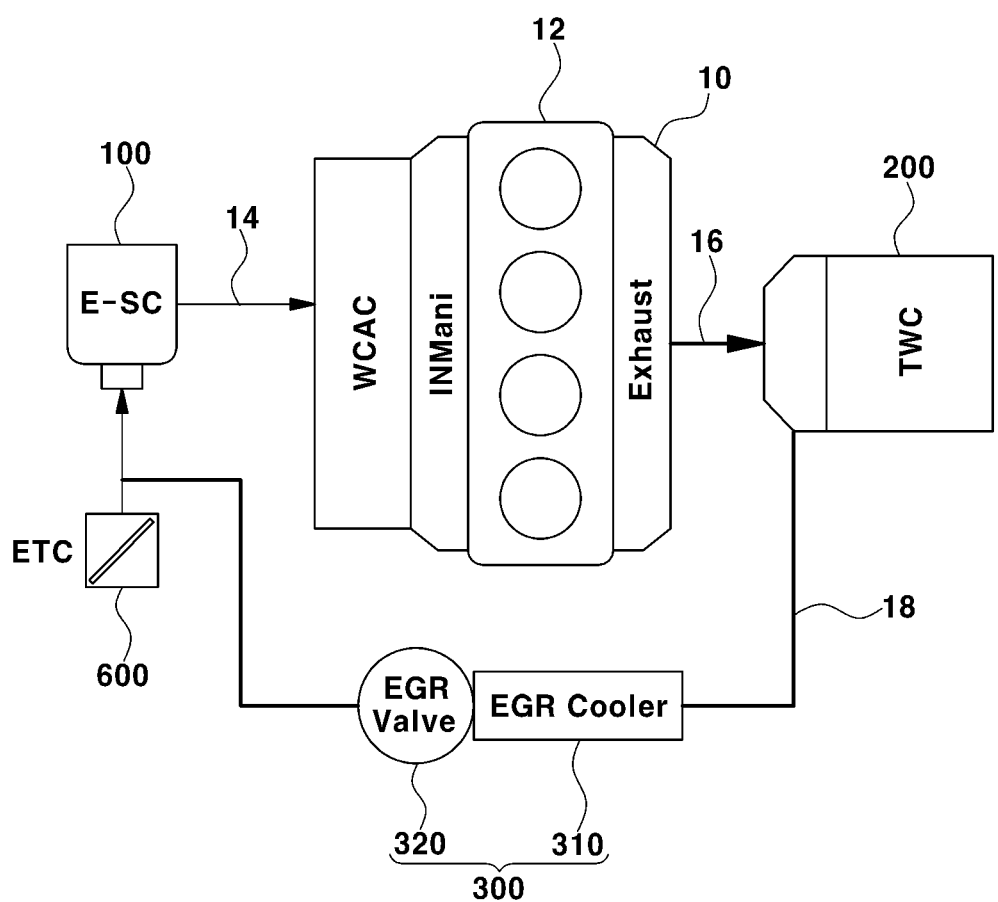
FIG. 2 is a diagram illustrating a related-art structure of the apparatus of purifying exhaust gas of a hybrid vehicle according to an embodiment of the present disclosure.

FIG. 1 is a diagram illustrating a structure of an apparatus of purifying exhaust gas of a hybrid vehicle according to various exemplary embodiments of the present disclosure, and FIG. 2 is a diagram illustrating a related-art structure of the apparatus of purifying exhaust gas of a hybrid vehicle according to an embodiment of the present disclosure.

As illustrated in FIG. 1, the apparatus of purifying exhaust gas of a hybrid vehicle according to the exemplary embodiment includes an electric supercharger 100, a post-treatment unit 200, an exhaust gas recirculation (EGR) unit 300, a three-way valve 400, and a controller 500.

Typically, an engine 10 includes a plurality of cylinders 12 generating driving force through the combustion of fuel. The engine 10 includes an intake line 14 through which intake gas to be supplied to the cylinder moves and an exhaust line 16 through which exhaust gas discharged from the cylinders 12 moves.

Here, the post-treatment unit 200 including a catalyst purifying a variety of hazardous substances in the exhaust gas discharged from the cylinders 12 is provided on the exhaust line 16. The post-treatment unit 200 may include a lean NOx trap (LNT), a diesel oxidation catalyst (DOC), and a diesel particulate filter (DPF) to purify nitrogen oxide (NOx)s.

An electrically-heated catalyst (EHC) 210 is provided in the post-treatment unit 200. The EHC 210 is configured to selectively heat the post-treatment unit 200 as required.

Furthermore, the electric supercharger 100 is disposed on the intake line 14 to supply supercharged air to the cylinders 12. Although not shown in the drawings, the electric supercharger 100 includes a motor and an electric compressor. The electric compressor is driven by the motor to serve to compress external air and supply the compressed external air to the cylinders 12 depending on operation conditions.

Furthermore, the EGR unit 300 is configured to cool exhaust gas recirculated from the post-treatment unit 200 and adjust the amount of the exhaust gas. In this regard, the EGR unit 300 includes an exhaust gas recirculation (EGR) cooler 310 disposed on a recirculation line 18 connecting the post-treatment unit 200 and the intake line 14 and an EGR valve 320 disposed on the recirculation line 18.

Furthermore, the three-way valve 400 is disposed at a position at which the recirculation line 18 diverges into the front end portion and the rear end portion of the intake line 14. The three-way valve 400 is selectively opened to allow high-temperature air supplied to the rear end portion of the electric supercharger 100 to move to the EHC 210 of the post-treatment unit 200 through the recirculation line 18.

Generally, as illustrated in FIG. 2, the EGR cooler 310 and the EGR valve 320 are disposed on the recirculation line 18 to cool the exhaust gas recirculating from the post-treatment unit 200 and adjust the amount of the same exhaust gas. However, as the introduction of the EHC 210 for reducing light-off time (i.e., a time period at which the catalyst becomes active) has recently been considered to innovatively improve the exhaust gas purification performance due to tighter emission regulations, the related-art structure provided with the EHC 210 cannot directly heat the EHC 210 before starting the engine. Thus, it is inevitably difficult to shorten the light-off time.

That is, the EHC 210 for purifying exhaust gas discharged from the engine must be heated by applying both direct electric heating and heated air convection heating using the supply of air to the EHC 210 before the start of the engine. However, in the related-art structure, supercharged air for heating the post-treatment unit 200 cannot be directly delivered to the EHC 210, making it impossible to shorten the light-off time.

Furthermore, generally, even in the case that supercharged air is supplied to the EHC 210, a separate air supply system, such as an air pump, an on/off valve, a BPS, an air pipe, or a connection gasket, must be provided, the problem of excessive material costs may occur, and forming a package may be problematic due to the excessively increased number of components. Thus, when the components are packaged, the size of the engine may be increased, which is problematic.

In this regard, in various exemplary embodiments of the present disclosure, the front end portion and the rear end portion of the intake line 14 of the electric supercharger 100 are connected to paths diverging from the recirculation line 18, and the three-way valve 400 is disposed on the corresponding diverging position to be selectively opened or closed by the controller 500. Thus, before the start of the engine, ambient air supplied to the electric supercharger 100 may be heated and flow toward the EHC 210 in a situation in which the electric supercharger 100 is in an on position, heating the EHC 210.

Before the start of the engine, the controller 500 may control the three-way valve 400 to be selectively opened or closed so that high-temperature air discharged from the electric supercharger 100 can move to the EHC 210 of the post-treatment unit 200 through the recirculation line 18.

Furthermore, the controller 500 may be connected to not only the three-way valve 400 but also the electric supercharger 100, the post-treatment unit 200, the EGR unit 300, and a shut-off valve 600 comprised of an electric throttle control (ETC) to control the operation of each of the components.

In other words, when a vehicle door is opened in a cold start condition corresponding a temperature ranging from 0° C. to −10° C. or lower, before ignition of the engine, the controller 500 controls the operation of the EHC 210 to be started and maximizes the opening amount of the shut-off valve 600, allowing ambient air to be supplied to the electric supercharger 100. In a situation in which the electric supercharger 100 is driven due to the supply of ambient air, the controller 500 may control the three-way valve 400 to direct supercharged air discharged from the electric supercharger 100 toward the EHC 210.

Here, when the operation time for heating the EHC 210 has passed for a predetermined time period or shorter, the controller 500 determines again whether to activate the ignition of the engine (IG ON). When the engine is ignited, the controller 500 switches the opening amount of the shut-off valve 600 to the initial state, turns the electric supercharger 100 off, and controls the opening and closing of the three-way valve 400 so that the front of the electric supercharger 100 and a portion of the recirculation line 18 are closed.

For example, after the operation time of the EHC 210 has passed for 5 seconds or shorter, when the ignition of the engine (IG ON) is performed by the driver, the EHC 210 is in a sufficiently-heated state, i.e., the post-treatment unit 200 is in a heated state to be able to purify exhaust gas discharged from the cylinders 12, the controller 500 controls the shut-off valve 600, the electric supercharger 100, and the three-way valve 400 as described above.

The controller 500 may switch the opening amount of the shut-off valve 600 to the initial state, turn the electric supercharger 100 on, and control the opening and closing of the three-way valve 400 so that typical exhaust gas purification is performed. That is, the controller 500 may cool exhaust gas discharged from the post-treatment unit 200 using the EGR cooler 310, adjust the amount of the exhaust gas using the EGR valve 320, and direct purified exhaust gas to return to the engine 10 through the electric supercharger 100 (in the direction of an arrow indicated with a solid line in FIG. 1), so that the exhaust gas may be purified by exhaust gas recirculation.

Furthermore, when the ignition of the engine (IG ON) is not ignited by the driver in a situation in which the operation time of the EHC 210 has exceed 5 seconds, the controller 500 determines that the driver is not intended to drive and controls the EHC 210 and the electric supercharger 100 for heating the post-treatment unit 200 to be turned off before the start of the engine.

The above-described operation control by the controller 500 conducted before the start of the engine may be a control operation corresponding to the initial start. In contrast, the above-described operation control by the controller 500 may be a control operation corresponding to a point in time before driving control over the engine while driving in EV mode in a hybrid vehicle.

That is, as predetermined EV mode stop conditions are met during the driving in EV mode, before the start of the engine in the cold start condition, the controller 500 may control the operation of the EHC 210, controls ambient air to be supplied to the electric supercharger 100 by opening the shut-off valve 600, and in a situation in which the electric supercharger 100 is turned on, control the three-way valve 400 to direct high-temperature air discharged from the front end portion of the electric supercharger 100 toward the EHC 210.

Here, the EV mode stop conditions may be previously set to meet a condition in which the state of charge (SOC) value of the battery is equal to or lower than a predetermined value.

According to the above description, during the driving in EV mode, when the SOC value of the battery is determined to be equal to or lower than the predetermined value, i.e., a minimum battery value for the driving in EV mode, and at the instant time, when the temperature around the vehicle is determined to meet the cold start condition, e.g., a temperature ranging from 0° C. to −10° C. or lower, heating the EHC 210 is performed before the start of the engine. In the present situation, as described above, before the stop of the EV mode (before the start of the engine), the opening amount of the shut-off valve 600 is maximized to supply ambient air to the electric supercharger 100. In a situation in which the electric supercharger 100 is driven in response to the supply of the ambient air, the three-way valve 400 is controlled to direct supercharged air discharged from the electric supercharger 100 toward the EHC 210.

Here, although the EV mode stop conditions have been referred to as being determined by comparing the SOC value of the battery with a predetermined value, the present disclosure is not limited thereto and the EV mode stop conditions may be determined by comparison with other variables having the same function.

Figure 3:
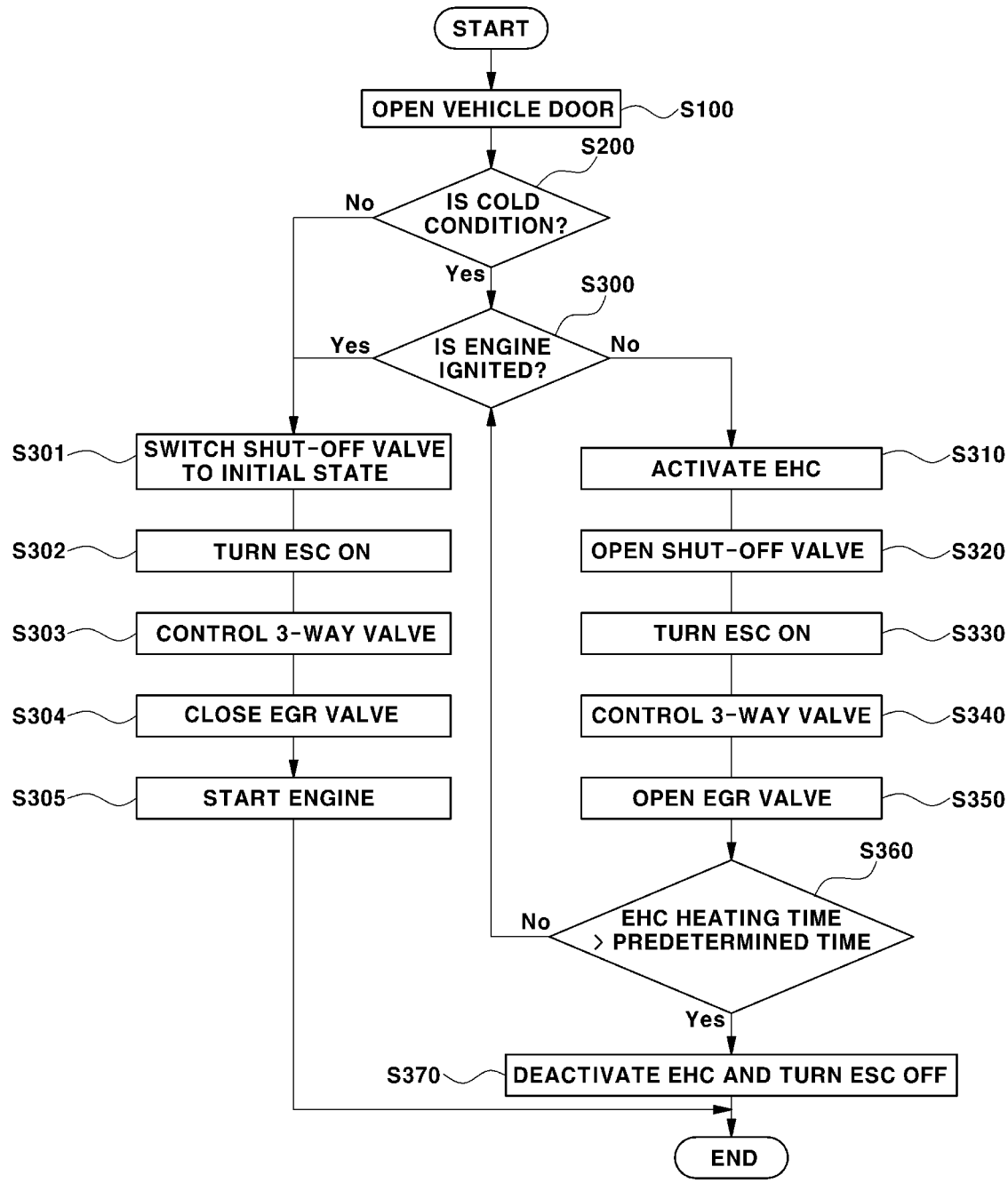
FIG. 3 is a flowchart sequentially illustrating a method of purifying exhaust gas of a hybrid vehicle according to various exemplary embodiments of the present disclosure.

FIG. 3 is a flowchart sequentially illustrating a method of purifying exhaust gas in a hybrid vehicle according to various exemplary embodiments of the present disclosure.

As illustrated in FIG. 3, the method of purifying exhaust gas in a hybrid vehicle according to the exemplary embodiment will be described sequentially as follows.

First, when a vehicle door is opened in S100, an ambient temperature is measured using a temperature sensor. Whether the measured ambient temperature satisfies a cold start condition, e.g., a temperature ranging from 0° C. to −10° C. or lower, is determined in S200.

When the measured ambient temperature is determined to not be in the cold start condition in S200, the controller 500 controls the opening amount of the shut-off valve 600 to be the initial state, turns the electric supercharger 100 off, and controls the opening and closing of the three-way valve 400 so that typical exhaust gas purification is performed. That is, the controller 500 cools exhaust gas discharged from the post-treatment unit 200 using the EGR cooler 310, adjusts the amount of the exhaust gas using the EGR valve 320, and directs purified exhaust gas to return to the engine 10 through the electric supercharger 100, so that the exhaust gas is purified by exhaust gas recirculation.

When the measured ambient temperature is determined to be in the cold start condition in S200, whether engine ignition is performed to start the engine is determined in S300. When the engine is determined as not being ignited, the controller 500 controls high-temperature air discharged from the front end portion of the electric supercharger 100 to be blown to the EHC 210 through the recirculation line 18 by controlling the three-way valve 400.

That is, in a situation in which the driver has opened the vehicle door in S100 and the cold start condition is met in S200, when the engine is determined as not being ignited in S300, the controller 500 controls the EHC 210 to be turned on before a driver's intention to drive (IG ON) is input in S310.

In the present situation, the controller 500 controls ambient air to be supplied to the electric supercharger 100 by maximizing the opening amount of the shut-off valve 600 in S320. At the instant time, the electric supercharger 100 is driven at, for example, 3000 revolutions per minute (RPM) to heat the ambient air in S330.

Here, when the electric supercharger 100 is in a high-pressure state, the controller 500 opens the three-way valve 400 so that the intake line 14 and the recirculation line 18 communicate each other in S340. Simultaneously, the controller 500 fully opens the EGR valve 320 in S350, directing high-temperature and high-pressure air discharged from the front end portion of the electric supercharger 100 toward the EHC 210 of the post-treatment unit 200 having a relatively low temperature.

At the present time, as the high-temperature air is blown to the EHC 210 and operation time for heating the EHC 210 has passed for a predetermined operation time, e.g., 5 seconds or shorter, whether the engine is ignited is determined again in S300.

When the operation time for heating the EHC 210 exceeds 5 seconds, the controller 500 determines that the driver has no intention to drive the vehicle even though the driver has entered the vehicle by opening the vehicle door and switches the EHC 210 and the electric supercharger 100 to off states in S370.

Consequently, by controlling the EHC 210 and the electric supercharger 100 to be selectively turned off, it is possible to minimize decreases in energy efficiency when there is no intention to drive.

When the operation time for heating the EHC 210 is equal to or shorter than 5 seconds and the engine is determined as being ignited by the operation of determining again whether the engine is ignited in S300, typical exhaust purification is performed as described above.

When the engine is ignited, the controller 500 switches the opening amount of the shut-off valve 600 to the initial state in S301, turns the electric supercharger 100 for heating ambient air off in S302, controls the opening and closing of the three-way valve 400 so that the opening of the front end portion of the electric supercharger 100 and the opening of the recirculation line 18 are blocked, closes a portion of the recirculation line 18 to return the EGR valve 320 to the initial position in S304, and then, starts the engine in S305.

Accordingly, in various exemplary embodiments of the present disclosure, during a time equal to or shorter than the predetermined heating time of the EHC 210, the temperature of the post-treatment unit 200 is raised by heating the EHC 210 by controlling the electric supercharger 100, the EGR unit 300, the three-way valve 400, and the shut-off valve 600, and in the present situation, the engine is started. Accordingly, it is possible to shorten the light-off time of the initial start in the cold start condition, improving the exhaust gas purification performance.

According to various exemplary embodiments of the present disclosure, in a lean burn engine for a hybrid electric vehicle (HEV) using an electric supercharger and an EGR system, the three-way valve connecting the supercharger and the EGR line is provided. Before start of the engine, the three-way valve is selectively opened so that supercharging air from the supercharger is blown toward the EHC through the EGR line. Consequently, the catalyst may be heated by delivering high-temperature EHC air to the catalyst, shortening the light-off time of the EHC.

Furthermore, according to various exemplary embodiments of the present disclosure, a separate air supply system, such as an air pump, an on/off valve, a BPS, an air pipe, or a connection gasket, for delivering supercharging air from the supercharger to the EHC is not required. Consequently, it is possible to prevent the problem of excessive material costs.

As set forth above, the present disclosure is not provided with the air supply system. Thus, in a situation in which a free space within the engine is insufficient, the difficulty to form a package and the problem of the increased engine size when forming the package, caused by the excessively increased number of components, may be prevented.

Furthermore, the term related to a control device such as "controller", "control apparatus", "control unit", "control device" or "control module", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of purifying exhaust gas of a hybrid vehicle, the apparatus comprises:
   an electric supercharger disposed on an intake line through which intake air to be supplied to cylinders of an engine flows;
   a post-treatment unit disposed on an exhaust line through which exhaust gas discharged from the cylinders flows and including an electrically-heated catalyst;

an exhaust gas recirculation unit including an exhaust gas recirculation cooler disposed on a recirculation line connecting the post-treatment unit and the intake line and an exhaust gas recirculation valve disposed on the recirculation line;

a three-way valve disposed at a position at which the recirculation line diverges into an ambient air supply line of a shut-off valve and the intake line; and a controller electrically connected to the three-way valve and configured for controlling the three-way valve to be selectively opened or closed so that heated air discharged from the electric supercharger selectively flows toward the post-treatment unit through the recirculation line.

2. The apparatus of claim 1, wherein, when a vehicle door is opened in a cold start condition, before the engine is ignited, the controller is configured to control the electrically-heated catalyst to be activated, to control ambient air to be supplied to the electric supercharger by opening a shut-off valve, to turn the electric supercharger on, and then, to control the three-way valve so that the heated air discharged from the electric supercharger flows toward the electrically-heated catalyst.

3. The apparatus of claim 2, wherein, when an operation time for heating the electrically-heated catalyst has passed for a predetermined operation time or shorter than the predetermined operation time, the controller is configured to determine again whether the engine is ignited.

4. The apparatus of claim 3, wherein, when the engine is ignited, the controller is configured to switch an opening amount of the shut-off valve to an initial state, to control the electric supercharger to be turned off, and to control the opening and closing of the three-way valve to block opening of the electric supercharger and opening of the recirculation line.

5. The apparatus of claim 3, wherein, when the engine has not been ignited beyond the predetermined operation time, the controller is configured to control the electrically-heated catalyst to be deactivated and the electric supercharger to be turned off.

6. The apparatus of claim 1, wherein, when a predetermined electric vehicle mode stop condition is met while driving in electric vehicle mode, before the engine is ignited, the controller is configured to control operation of the electrically-heated catalyst, to control ambient air to be supplied to the electric supercharger by opening a shut-off valve, to turn the electric supercharger on, and then, to control the three-way valve to direct the heated air, discharged from the electric supercharger, toward the electrically-heated catalyst.

7. The apparatus of claim 6, wherein the electric vehicle mode stop condition is set in advance to meet a condition in which a state of charge of a battery is equal to or lower than a predetermined value.

8. A method of purifying exhaust gas of a hybrid vehicle, the method comprises:

when a vehicle door is opened, measuring, by a controller, an ambient temperature using a temperature sensor and determining, by the controller, whether the ambient temperature satisfies a cold start condition;

before an engine is ignited in the cold start condition, controlling, by the controller, a three-way valve to direct heated air discharged from an electric supercharger to be blown toward an electrically-heated catalyst through a recirculation line connected to the three-way valve;

after the heated air is blown toward the electrically-heated catalyst, when an operation time for heating the electrically-heated catalyst has passed for a predetermined operation time or shorter than the predetermined operation time, determining, by the controller, again whether the engine is ignited; and when the engine is ignited in a situation in which the electrically-heated catalyst is heated by the heated air, turning the electric supercharger off, controlling, by the controller, the three-way valve to block opening of the recirculation line, and then, starting the engine.

9. The method of claim 8, wherein the controlling, by the controller, the three-way valve to direct the heated air discharged from the electric supercharger includes, sequentially:

controlling the electrically-heated catalyst to be activated;

opening a shut-off valve so that the ambient air is supplied;

turning the electric supercharger on; and controlling the three-way valve to direct the heated air, discharged from the electric supercharger, to flow toward the electrically-heated catalyst.

10. The method of claim 8, wherein, when the engine has not been ignited beyond the predetermined operation time, the controller is configured for controlling the electrically-heated catalyst to be deactivated and the electric supercharger to be turned off.

11. The method of claim 8, wherein, when the engine is ignited, the controller is configured to switch an opening amount of a shut-off valve to an initial state, to control the electric supercharger to be turned off, and to control the opening and closing of the three-way valve to block opening of the electric supercharger and opening of the recirculation line.

12. The method of claim 8, wherein, when a predetermined electric vehicle mode stop condition is met while driving in electric vehicle mode, before the engine is ignited, the controller is configured to control operation of the electrically-heated catalyst, to control ambient air to be supplied to the electric supercharger by opening a shut-off valve, to turn the electric supercharger on, and then, to control the three-way valve to direct the heated air, discharged from the electric supercharger, toward the electrically-heated catalyst.

13. The method of claim 12, wherein the electric vehicle mode stop condition is set in advance to meet a condition in which a state of charge of a battery is equal to or lower than a predetermined value.

* * * * *